No. 852,052. PATENTED APR. 30, 1907.
W. BECHTOL.
TOBACCO TRUCK.
APPLICATION FILED JUNE 5, 1906.

2 SHEETS—SHEET 1.

Witnesses
G. R. Thomas
F. B. MacWat.

Inventor
W. Bechtol
By
Attorneys

THE NORRIS PETERS CO., WASHINGTON, D. C.

No. 852,052.

PATENTED APR. 30, 1907.

W. BECHTOL.
TOBACCO TRUCK.
APPLICATION FILED JUNE 5, 1906.

2 SHEETS—SHEET 2.

Witnesses
G. R. Thomas
F. B. MacNab

Inventor
W. Bechtol
By Chandler & Chandler
Attorneys

UNITED STATES PATENT OFFICE.

WILLIAM BECHTOL, OF ARCANUM, OHIO.

TOBACCO-TRUCK.

No. 852,052.  Specification of Letters Patent.  Patented April 30, 1907.

Application filed June 5, 1906. Serial No. 320,358.

*To all whom it may concern:*

Be it known that I, WILLIAM BECHTOL, a citizen of the United States, residing at Arcanum, in the county of Darke, State of Ohio, have invented certain new and useful Improvements in Tobacco-Trucks; and I do hereby declare the following to be a full, clear, and exact description of the invention, such as will enable others skilled in the art to which it appertains to make and use the same.

This invention has reference to tobacco trucks, the object in general thereof being to construct a strong, durable, and efficient device of that nature.

The particular improvements consist in the means for supporting the truck, and to this end the essential features of the invention comprise a truck including a body having a pair of U-shaped oppositely-disposed braces, secured to the under face thereof, a single axle located toward the rear end of the truck and carrying supporting wheels, and a brace secured to the under face of the truck at its rear end.

The invention will be more clearly understood from a consideration of the following detailed description, and from an inspection of the accompanying drawings, in which:—

Figure 1:
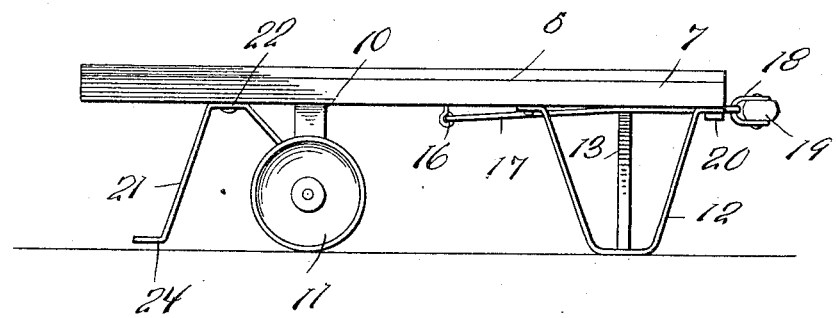
Figure 2:
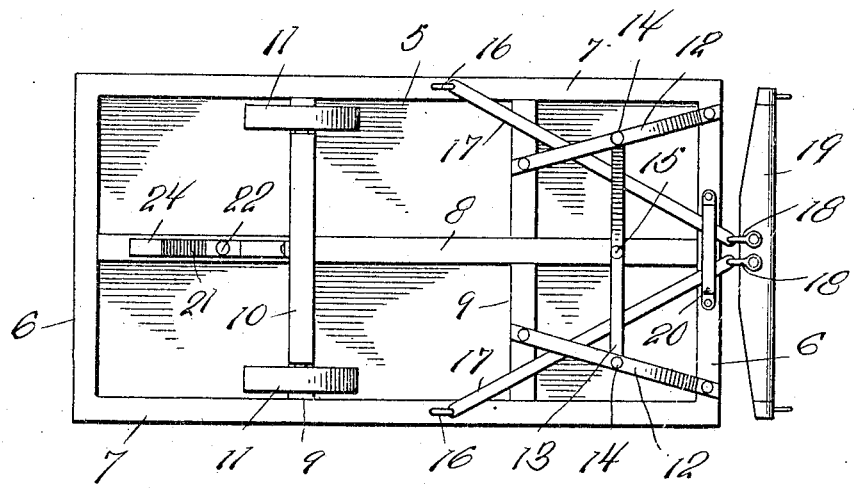
Figure 3:
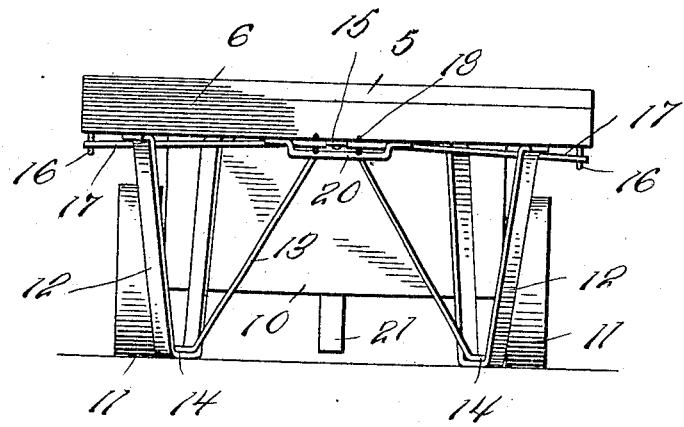
Figure 4:
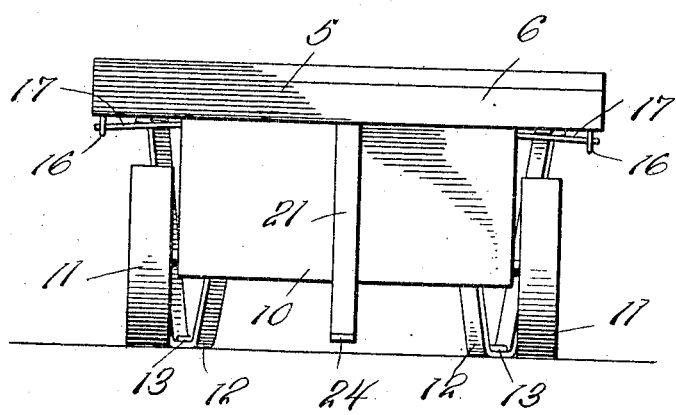

Figure 1 is a side elevation of my invention. Fig. 2 is a bottom plan view of the same. Fig. 3 is a front elevation. Fig. 4 is a rear elevation.

Similar parts are designated by corresponding numerals in the several views.

Referring to the drawings, 5 designates, generally, the truck body having depending front and rear end sills 6 and similar side sills 7. The end sills are connected by a depending sill 8, extending longitudinally of the body, and the side sills in like manner by transverse sills 9, 9.

Secured by any preferred means to the rear transverse sill 9 is an axle 10 carrying supporting wheels 11. The front sill 9 and end sill 6 are connected by a pair of oppositely-disposed U-shaped depending braces 12, so arranged as to diverge toward the end sill, as shown in Fig. 2. Braces 12 are connected by a transverse brace 13, the ends of which are secured to the respective braces 12, as at 14, brace 13 being further secured intermediate its ends to the longitudinal sill 8, as at 15.

Pivoted at their rear ends to the respective side sills 7 of the truck body, as at 16, is a pair of rods 17, the front ends of which are secured by means of short links 18 with a whiffle-tree 19, the swinging movement of said rods being limited by a bent rod 20, secured to the under face of the front sill 6. As further shown in Fig. 2, each rod 17 passes through the corresponding brace 12.

Owing to the location of the brace 12 at the forward end of the truck, it is possible to dispense with a front axle and wheels, and by reason of the direct connection of the whiffle-tree to rods 17, there is likewise no occasion for the use of a pole or tongue, and, at the same time, the truck may be drawn nearer the tobacco patch than would be possible if a pole were used. The adjustable connection of the whiffle-tree or hitch with respect to the sides will prevent its jerking sidewise in rough or uneven ground, and any tendency to a side movement is counteracted by the transfer of the pull to the opposite side.

Secured at its forward end to axle 10, intermediate the ends thereof, is a third brace 21, which is further connected with the intermediate longitudinal sill 8, as at 22, the said brace being then bent rearwardly, as shown in Fig. 1, and its free end formed with a foot 24 extending toward the rear end of the truck.

It will be understood from the above that the front braces 12 and rear brace 21 will, together with the axle and its wheels, support the truck when the same is stationary, the front braces being raised when the pull upon the truck is drawn forwardly, when the weight of the entire truck will be thrown upon the supporting wheels. The several braces, in like manner, act as sled runners when the pull is slackened, thus permitting full control of the truck when the same is being drawn up or down hill, due to the action of the braces as brakes.

In the actual construction of the truck, the several braces are formed of steel, and have flat under faces, and the wheels in like manner have a wide peripheral surface. The body proper of the truck is of sufficient width to enable the tobacco to be loaded from both sides at once.

From the foregoing it is thought that the construction and operation of the herein described invention will be apparent without further description, and it will be understood that various changes in the size, shape, proportion, and minor details of construction, may be resorted to without departing from the spirit or sacrificing any of the advantages of the invention.

What is claimed, is:—

1. A tobacco truck comprising a body having depending longitudinal and transverse sills; an axle secured to one of said transverse sills toward the rear end of said body and carrying supporting wheels; a pair of oppositely disposed U-shaped braces secured to said transverse sills in advance of said axle; and a brace secured to one of said longitudinal sills in the rear of said axle.

2. A tobacco truck comprising a body having depending transverse and longitudinal sills; an axle secured to one of said transverse sills toward the rear end of said body, and carrying supporting wheels; a pair of oppositely-disposed depending U-shaped braces secured to said transverse sills in advance of said axle; a transverse brace secured at opposite ends to said U-shaped braces, and intermediate its ends to one of said longitudinal sills; and a brace secured at its forward end to said axle, and at its rear end to said longitudinal sill, said brace extending rearwardly of said axle.

3. A tobacco truck comprising a body having depending side and end sills secured to its under face, and intermediate sills connecting the respective side and end sills; an axle secured to one of said connecting sills toward the rear end of said body and carrying supporting wheels; a pair of oppositely-disposed depending U-shaped braces connecting said front end sill with the adjacent intermediate sill; a pair of rods pivotally connected at their rear ends to said side sills and extending beyond the front sill, said rods passing through the respective U-shaped braces; a whiffle-tree secured to the forward ends of said rods; means secured to said front sill for limiting the pivotal movement of said rods; and a depending brace secured at one end to said axle and extending rearwardly thereof.

In testimony whereof, I affix my signature, in presence of two witnesses.

WILLIAM BECHTOL.

Witnesses:
E. M. TOWNSEND,
EZRA POST.